United States Patent [19]

Kinoshita

[11] Patent Number: 4,812,973
[45] Date of Patent: Mar. 14, 1989

[54] MULTIPROCESSOR SYSTEM AND CONTROL METHOD THEREFOR

[75] Inventor: Kiyoshi Kinoshita, Kokubunji, Japan

[73] Assignee: Kabushiki Kaisha Toshiba, Kawasaki, Japan

[21] Appl. No.: 706,276

[22] Filed: Feb. 27, 1985

[30] Foreign Application Priority Data

Feb. 29, 1984 [JP] Japan .................... 59-38087
Feb. 29, 1984 [JP] Japan .................... 59-38089

[51] Int. Cl.⁴ .................... G06F 15/16
[52] U.S. Cl. .................... 364/200
[58] Field of Search .................... 364/200, 900

[56] References Cited

U.S. PATENT DOCUMENTS

| | | | |
|---|---|---|---|
| 4,415,972 | 11/1983 | Adcock | 364/200 |
| 4,443,846 | 4/1984 | Adcock | 364/200 |
| 4,486,826 | 12/1984 | Wolff et al. | 364/200 |
| 4,603,383 | 7/1986 | Tanaka et al. | 364/200 |
| 4,675,811 | 6/1987 | Kishi et al. | 364/200 |

*Primary Examiner*—Gareth D. Shaw
*Assistant Examiner*—Kevin A. Kriess
*Attorney, Agent, or Firm*—Foley & Lardner, Schwartz, Jeffery, Schwaab, Mack, Blumenthal & Evans

[57] ABSTRACT

In a multiprocessor system in which bidirectional data transfer is effected among a plurality of processors through at least one data buffer permitting the transfer data to be read therefrom and written thereinto, judgement is made as to whether the transfer data can be read from the data buffer and/or written thereinto on the basis of information about the read and/or write addresses of the data buffer, and the processing of each of processors is interrupted on the basis of the result of the judgement to cause the processor to read the transfer data from the data buffer and/or write it thereinto.

8 Claims, 8 Drawing Sheets

| READ ADDRESS SIGNAL | | WRITE ADDRESS SIGNAL | | BUFFER ADDRESS | |
|---|---|---|---|---|---|
| RA1 | RA0 | WA1 | WA0 | FIRST BUFFER | SECOND BUFFER |
| 1 | 1 | 1 | 1 | A(3) | B(3) |
| 1 | 0 | 1 | 0 | A(2) | B(2) |
| 0 | 1 | 0 | 1 | A(1) | B(1) |
| 0 | 0 | 0 | 0 | A(0) | B(0) |

MULTIPROCESSOR SYSTEM AND CONTROL METHOD THEREFOR

BACKGROUND OF THE INVENTION

The present invention realtes to a multiprocessor system comprising a plurality of processors, and more particularly to a multiprocessor system used in a data transfer between a plurality of microprocessors.

Hitherto, for transferring data between a plurality of microprocessors, there have been proposed a system called "input/output (I/O) connection system", a system using a FIFO (First-In First-Out) controller, or a system using a shared memory, etc.

The first system called "I/O connection system", e.g., comprises first and second processors, a parallel I/O controller (PIO) for controlling input of data to the first processor and/or output of data therefrom, and another parallel I/O adapter (PIA) for controlling input of data to the second processor and/or output of data therefrom. The first processor and the PIO are connected by means of a bus, the PIP and the PIA are connected by means of a data line, and the second processor and the PIA are connected by means of a bus. Transfer data from the first processor is fed to the PIO through the bus. Then, the transfer data fed to the PIA from the PIO through the data line is fed to the second processor through the bus. Likewise, transfer data from the second processor is fed to the PIA through the bus. Then, the transfer data fed to the PIO from the PIA through the data line is fed to the first processor through the bus. With the system, mutual data transfer between the first and second processors can be performed. However, the drawback with this system is that data transfer per byte is only possible, resulting in degrading the transfer efficiency.

Further, the second system using a FIFO controller is disclosed in, e.g., Japanese Patent Laid-open Publication No. 110167/1981 wherein data transfer between first and second processors is performed via a data line and the FIFO controller. The system can perform mutual data transfer between processors, but has drawbacks that the whole system becomes costly because the FIFO controller is expensive and the FIFO controller has a limited number of processors connectable thereto.

Furthermore, the third system using a shared memory is disclosed in, e.g., Japanese Patent Laid-open Publication No. 50037/1982 wherein data transfer between first and second processors is performed in a manner that one processor writes the transfer data into the shared memory through an access controller and the other processor reads it from the shared memory through the access controller. The system can perform mutual data transfer between processors, but has drawbacks that the both processors cannot access the shared memory at the same time and the access controller becomes structurally complicated.

SUMMARY OF THE INVENTION

A first object of the present invention is to realize a simplified and inexpensive multiprocessor system in which a plurality of microprocessors, particularly those having internal architecture different from each other are connected.

A second object of the present invention is to make it possible to effect bidirectional data transfer between microprocessors and to increase the transfer efficiency.

A third object of the present invention is to provide interrupt control means which judges whether writing and reading of data is permissible or not on the basis of address data, etc. to effect an interrupt control, thereby to avoid the situation where an extra load required for software processing is imposed on each processor, thus reducing processing steps of the processor to improve the transfer efficiency.

A fourth object of the present invention is to allow the interrupt control means to effect an interrupt control on the basis of address data, etc., thereby eliminating the provision of particular I/O ports and logic circuits on each processor.

To achieve these objects, the present invention provides a control method for a multiprocessor system for effecting bidirectional data transfer among a plurality of processors through at least a data buffer of a plurality of bytes which transfer data can be read out from or written into, the improvement wherein the method comprises a first step for judging at the time of data transfer as to whether the readout/write-in of the transfer data in the data buffer is possible on the basis of information about the read/write address of the data buffer, and a second step of one of the processors interrupting the processing of the other processor on the basis of the result of the judgement to read/write mutually the transfer data with respect to the data buffer.

The present invention further provides a multiprocessor system suitable for realizing the abovementioned control method.

DETAILED DESCRIPTION OF THE INVENTION

Figure 1:
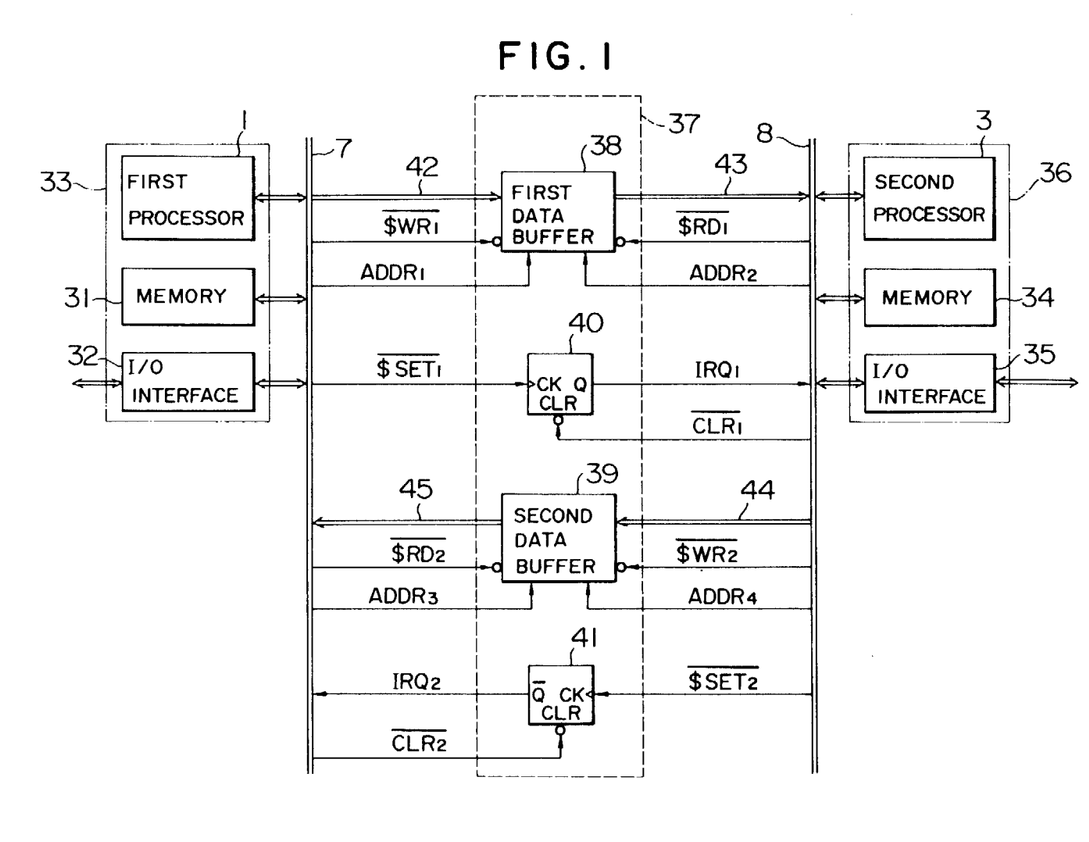
FIG. 1 is a block diagram schematically illustrating a first embodiment of a multiprocessor system according to the present invention.

As shown in FIG. 1, a multiprocessor system of the first embodiment comprises a first microprocessor system 33 including a first processor 1 having an internal architecture of 16 bits, a memory 31 and an I/O interface 32, a second microprocessor system 36 including a second microprocessor 3 having an internal architecture of 8 bits, a memory 34 and an I/O interface 35, and an Inter Processor Communication Circuit (which will be called an "IPC" hereinafter) 37 whereby the data transfer between the first and second systems 33 and 36 is effected via the IPC 37. The IPC 37 comprises a first data buffer 38 for holding four bytes of transfer data from the first system 33 to the second system 36, and a second data buffer 39 for holding four bytes of transfer data from the second system 36 to the first system 33. The IPC 37 further comprises a first flip-flop (F/F) 40 for storing the condition whether transfer data can be read out from the first data buffer 38 or not and transfer data can be written into the second data buffer 39 or not to provide an interrupt requires to the second system 36, and a second flip-flop (F/F) 41 for storing the condition whether transfer data can be read out from the second data buffer 39 or not and transfer data can be written into the first data buffer 38 or not to provide an interrupt request to the first system 33. The data transfer from the first system 33 to the first data buffer 38 is effected via a bus 7 and a data line 42. The data transfer from the first data buffer 38 to the second system 36 is effected via a data line 43 and a bus 8. Further, the data transfer from the second system 36 to the second data buffer 39 is effected via the bus 8 and a data line 44. The data transfer from the second data buffer 39 to the first system 33 is effected via a data line 45 and the bus 7.

Figure 2:
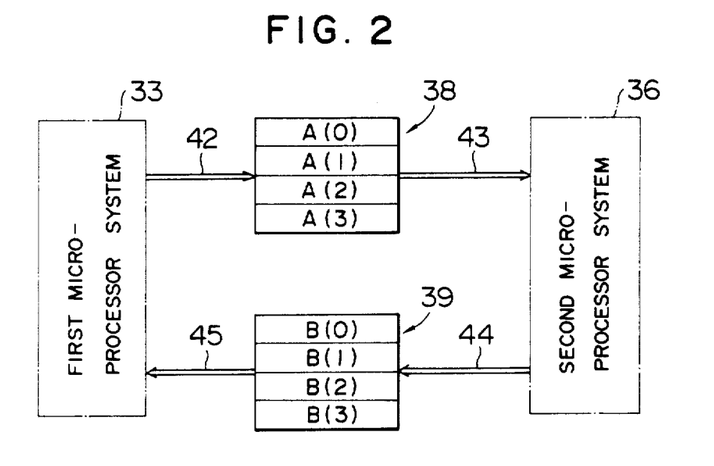
FIG. 2 is an explanatory view showing the relationship between the internal configuration of each data buffer and eachmicroprocessor shown in FIG. 1.

FIG. 2 is an explanatory view showing the relationship between internal configuration of the first and second data buffers 38 and 39 and the first and second systems 33 and 36. The first data buffer 38 has four divided-memory areas assigned to four addresses labelled by A(0) to A(3), each having a data capacity of four bytes. Likewise, the second data buffer 39 has four-divided addresses assigned to four addresses labelled by B(0) to B(3), each having a data capacity of four bytes.

Figure 3:
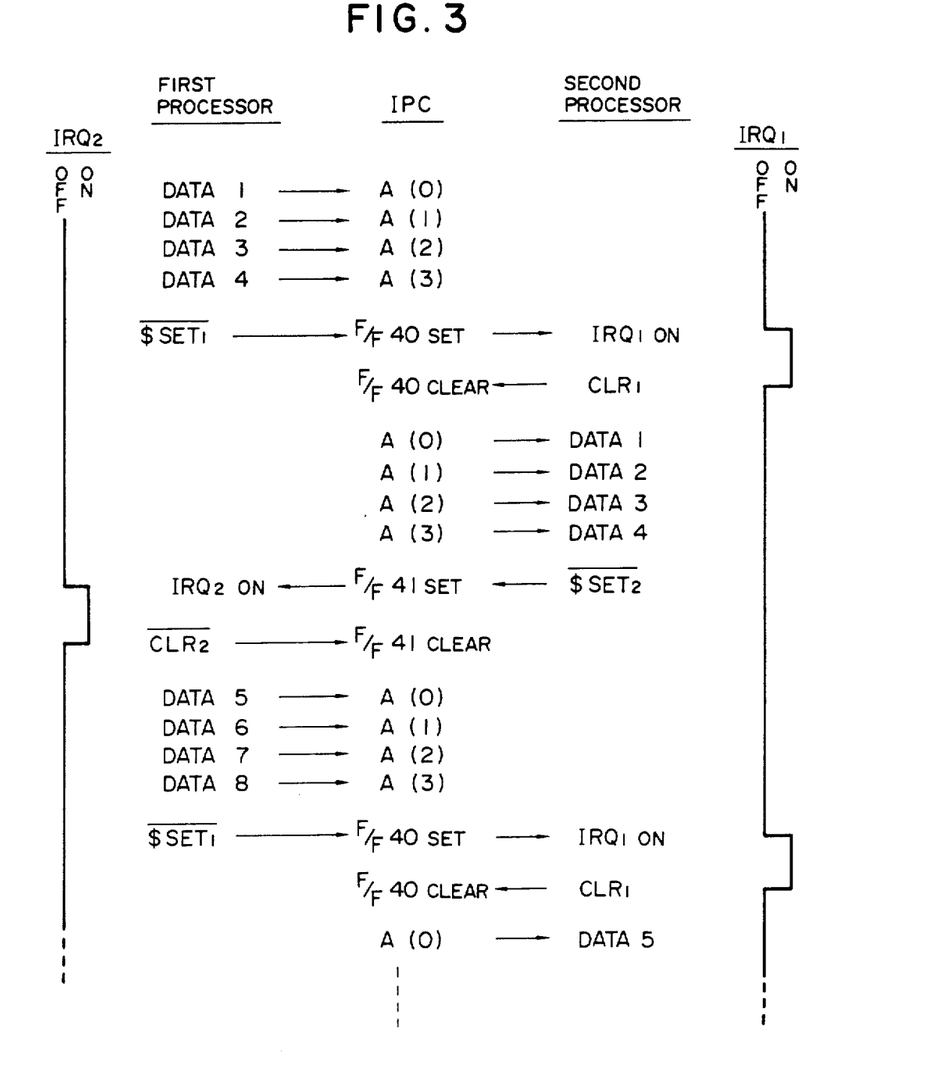
FIG. 3 is an explanatory view for an operation of the first embodiment shown in FIGS. 1 and 2.

Then, the operation of the first embodiment will be described with reference to FIG. 3 in connection with the case where data (DATA 1 to DATA 4) of four bytes is transferred from the first system 33 to the second system 36.

First, the first processor 1 designates an address of zero (A(0)) of the first data buffer 38 through the address line $ADDR_1$ to output a transfer data (DATA 1) on the data line 42. When the first processor 1 outputs a write strobe signal $\overline{SWR_1}$, DATA 1 on the data line 42 is written into the memory area assigned to the address A(0) of the first data buffer 38. Subsequently, in a similar manner, DATA 2 to 4 are written into the memory areas assigned to respective addresses A(1) to A(3) of the data buffer 38.

When the write operation of DATA 1 to 4 into the first data buffer 38 is completed, a set strobe signal $\overline{SSET_1}$ is output from the first processor 1 so that the first F/F 40 is set and an interrupt request signal (Q output of the F/F 40) fed to the second processor 3 is turned on. Thus, the second processor 3 can recognize that the transfer data has been written into the first data buffer 38, resulting in a read-enabled state.

Subsequently, the second processor 3 outputs a clear signal $\overline{CLR_1}$ to clear the first F/F 40, thereafter starting to read the transfer data from the first data buffer 38. First, the second processor 3 designates the address A(0) of the first data buffer 38 through an address line $ADDR_2$ to output a read strobe signal $\overline{SRD_1}$. Thus, DATA 1 stored in the memory area assigned to the zero address of the first data buffer 38 is outut on the data line 43 in synchronism with this signal $\overline{SRD_1}$. The second processor 3 reads DATA 1 thus output. Subsequently, in a similar manner, DATA 2 to 4 are read out of the first data buffer 38.

When the read operation of the transfer data (DATA 1 to 4) from the first data buffer 38 is completed, a set strobe signal $\overline{SSET_2}$ is output from the second processor 3 so that the second F/F 41 is set and an interrupt request signal $IRQ_2$ fed to the first processor 1 is turned on. Thus, the first processor 1 can recognize that the transfer data which have been stored in the first data buffer 38 are all read out, resulting in a write-enabled state.

Then, the first processor 1 outputs a clear signal $\overline{CLR_2}$ to clear the second F/F 41, thereafter starting to write transfer data (DATA 5 to 8) into the first data buffer 38. Subsequently, in a similar manner, the writing operation of transfer data from the first processor into the first data buffer 38 and the reading operation of transfer data from the first data buffer 38 to the second processor 3 are effected, thus performing data transfer from the first processor 1 to the second processor 3.

The data transfer from the second system 36 to the first system 33 will be effected through memory areas assigned to addresses B(0) to B(3) of the second data buffer 39 in accordance with a procedure similar to the above-mentioned procedure.

The present invention is not limited to the configuration of the above-mentioned first embodiment. Namely, generally the first data buffer 38 may have N bytes (N is a positive integer) and the second data buffer 39 may have M bytes (M is a positive integer). Further, the bit configuration of the internal architecture of each processor is not limited to those adopted in the above described embodiment. For instance, internal architecture having a desired bit configuration, e.g., 4 bits or 32 bits, etc. may be used.

A secone embodiment of the invention will be described with reference to FIGS. 4 to 9.

Figure 4:
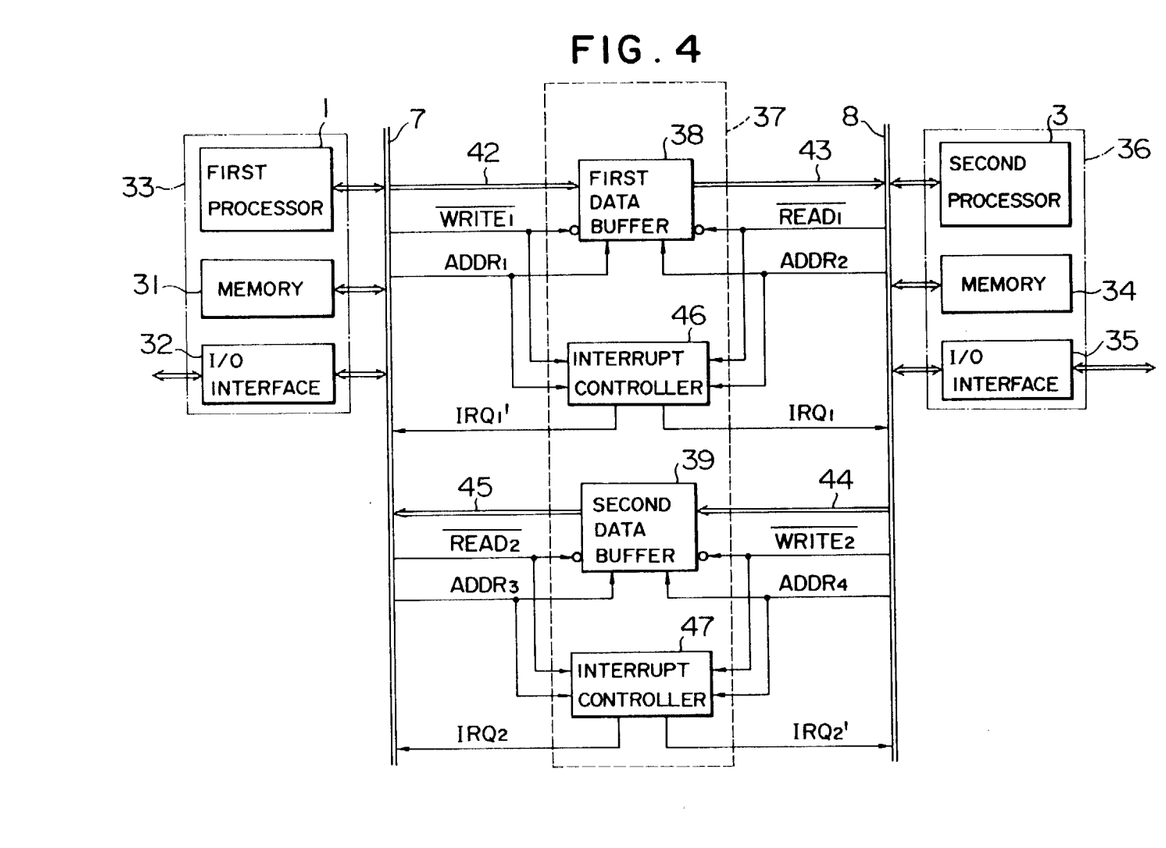
FIG. 4 is a block diagram schematically illustrating a second embodiment of a multiprocessor system according to the present invention.

Referring to FIG. 4, a multiprocessor system of this embodiment has a circuit configuration similar to that of the first embodiment, i.e., comprises first microprocessor system 33 including first processor 1 having an internal architecture of 16 bits, memory 31 and I/O interface 32, second microprocessor system 36 including second microprocessor 3 having internal architecture of 8 bits, memory 34 and I/O interface 35, and IPC 37 whereby the data transfer between the first and second systems 33 and 36 is effected via the IPC 37. The IPC 37 comprises data buffer 38 for holding 4 bytes of transfer data from the first system 33 to the second system 36, second data buffer 39 for holding 4 bytes of transfer data from the second system 36 to the first system 33, a first interrupt controller 46, and a second interrupt controller 47. The first interrupt controller 46 is configured so as to judge whether the first data buffer 38 is in a read-enable or write-enable state on the basis of a write control signal $\overline{WRITE_1}$ from the first processor 1, a read control signal $\overline{READ_1}$ from the second processor 3, and address data $ADDR_1$ and $ADDR_2$ to provide interrupt request signal $IRQ_1'$ and $IRQ_1$ to the first and second processors 1 and 3 based on the judgement result, respectively, thus controlling interrupt processings in the first and second processors 1 and 3. Likewise, the second interrupt controller 47 is configured so as to judge whether the second data buffer 39 is in a read-enable or write-enable state on the basis of a write control signal $\overline{WRITE_2}$ from the second processor 3, a read control signal $\overline{READ_2}$ from the first processor 1, and address data $ADDR_3$ and $ADDR_4$ to provide interrupt request signals $IRQ_2$ and $IRQ_2'$ to the first and second processors 1 and 3 based on the judgement result, respectively, thus controlling interrupt processing in the first and second processors 1 and 3.

The data transfer from the first system 33 to the first data buffer 38 is effected through the data line 42. The data transfer from the first data buffer 38 to the second system 36 is effected through the data line 43. On the other hand, the data transfer from the second system 36 to the second data buffer 39 is effected through the data line 44. The data transfer from the second data buffer 39 to the first system 33 is effected through the data line 45.

Figure 5:
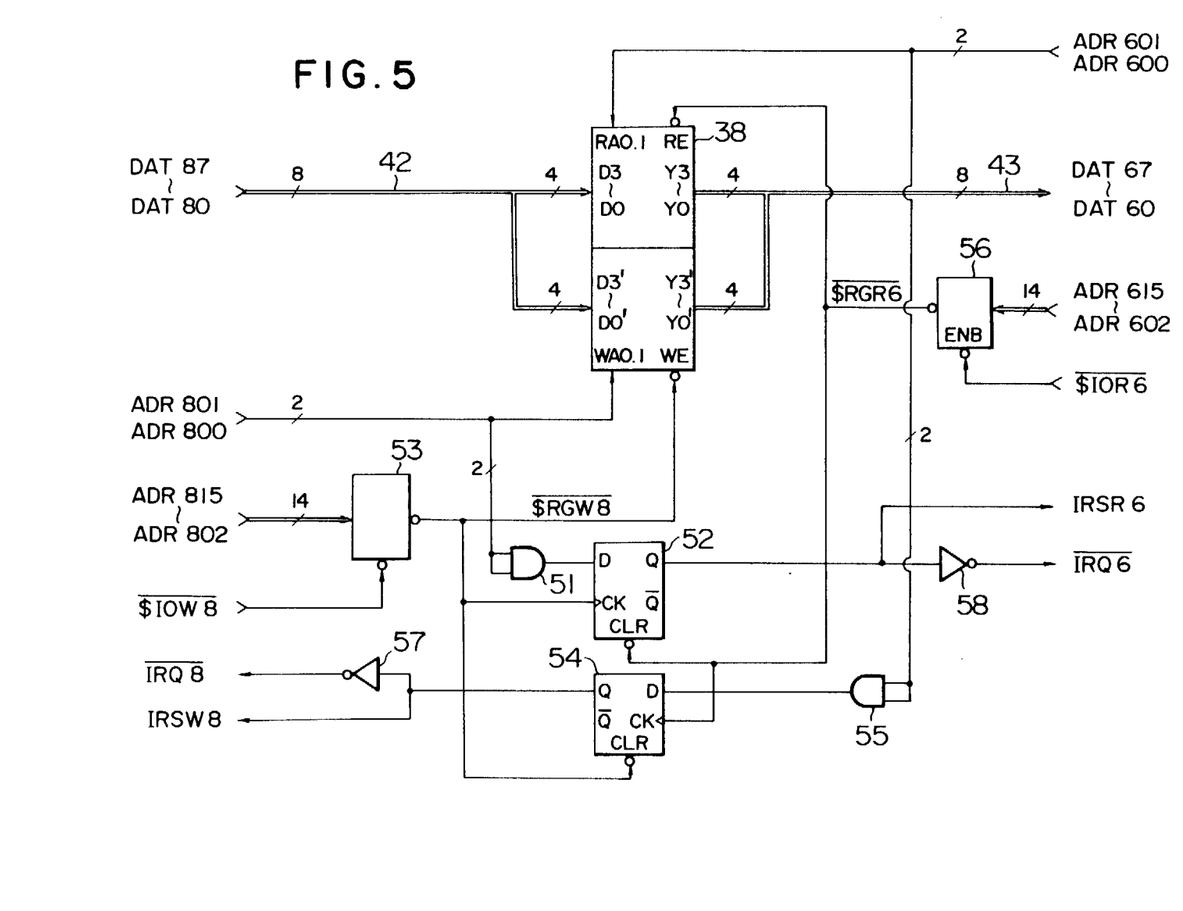
FIGS. 5 and 6 are block diagrams illustrating the essential part of the second embodiment shown in FIG. 4.

FIG. 5 is a detailed circuit configuration showing the first data buffer 38 and the first interrupt controller 46 shown in FIG. 4. Data transferred through the data line 42 of 8 bits (DAT 80 to DAT 87) are written into the first data buffer 38 through input ports D0 to D3 and D0' to D3', respectively. They are in turn output on the data line 43 of 8 bits (DAT 60 to DAT 67) through output ports Y0 to Y3 and Y0' to Y3', respectively. Lower 2 bits (ADR 800 and 801) for designating a write address among 16 bits of the address data output from the first processor 1 are fed to write address terminals WA0 and WA1 of the first data buffer 38. Further, logical multiplication of the lower 2 bits (ADR 800 and 801) is performed by an AND circuit 51 and the resulting outpout is fed to a D terminal of a flip-flop (F/F) 52. Furthermore, upper 14 bits (ADR 802 to 815) for designating an address of an I/O port and a write strobe signal $\overline{SIOW8}$ are fed to a decoder 53. The decoder 53 decodes the address data from the first processor 1 to provide a buffer write strobe signal $\overline{SRGW8}$ for the first data buffer 38 to a write enable terminal WE of the first data buffer 38, a clock terminal CK of the F/F 52 and a clear terminal CLR of a flip-flop (F/F) 54.

On the other hand, lower 2 bits (ADR 600 and 601) for designating a read address among 16 bits of address data output from the second processor 3 are fed to read address terminals RA0 and RA1 of the first data buffer 38. Logical multiplication of the lower 2 bits (ADR 600 and 601) is performed by an AND circuit 55 and the resulting output is fed to a D terminal of the F/F 54. Further, upper 14 bits (ADR 602 to 615) for designating an address for the I/O port and a read strobe signal $\overline{SIOR6}$ output from the second processor 3 are both fed to a decoder 56. The decoder 56 decodes address data from the second processor 3 to provide a buffer read strobe signal $\overline{SRGR6}$ for the first data buffer 38 to a read enable terminal RE of the first data buffer 38, a clock terminal CK of the F/F 54 and a clear terminal CLR of the F/F 52.

Outputs labelled by IRSW8 and IRSR6 output from the Q terminals of the F/F's 54 and 52 are used as status signals for checking interrupt causes, respectively. Outputs labelled by $\overline{IRQ8}$ and $\overline{IRQ6}$ from open-collector gates 57 and 58 and other interrupt request signals of the first and second processors 1 and 3 are wired OR, respectively. They are used as interrupt request signals to the first and second processors 1 and 3, respectively.

Figure 6:
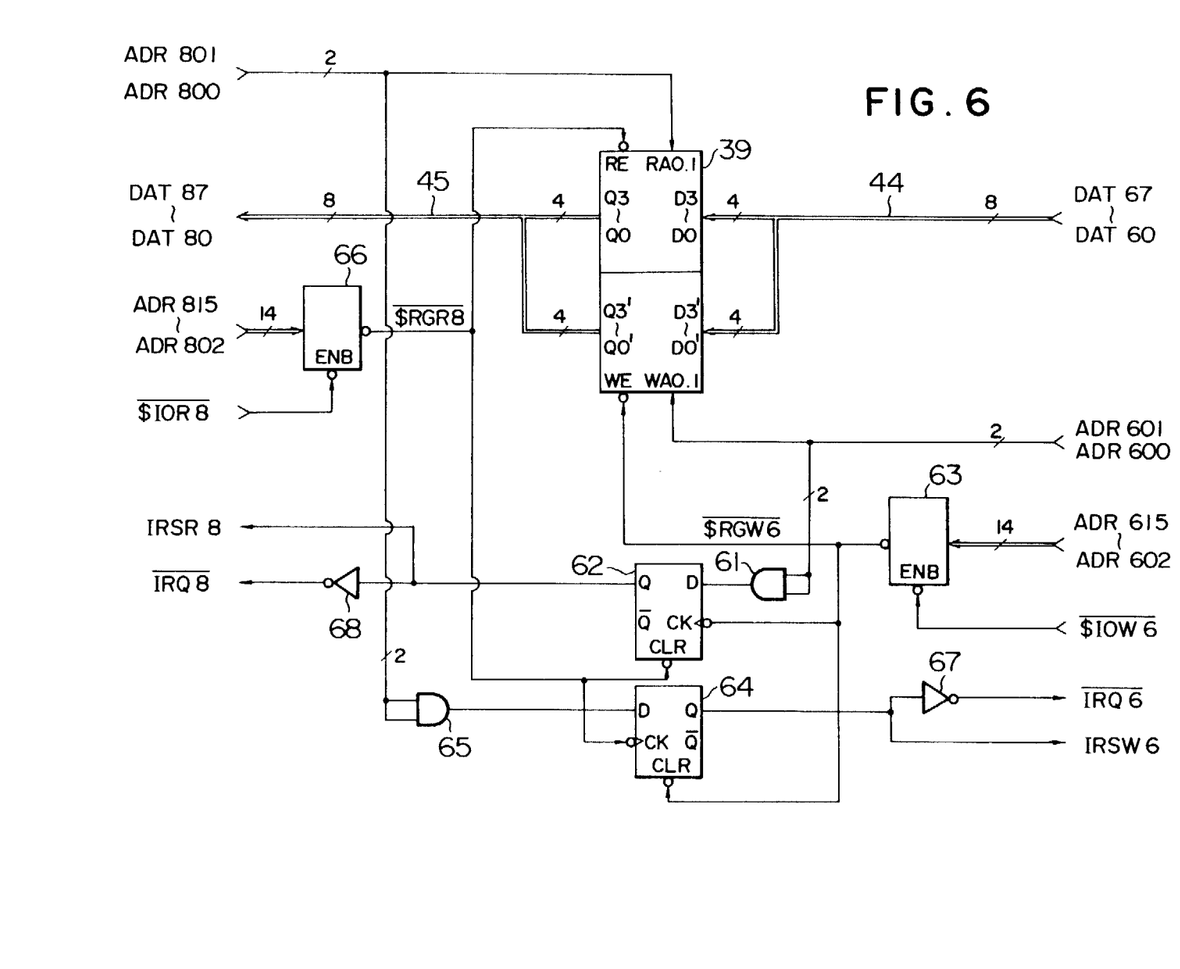

FIG. 6 is a detailed circuit configuration showing the second data buffer 39 and the second interrupt controller 47. Data which have been transferred through the data line 44 are written into the second data buffer 39 through the input ports D0 to D3 and D0' to D3' and are output on the data line 45 of 8 bits (DAT 80 to DAT 87) through the output ports Q0 to Q3 and Q0' to Q3'. Lower 2 bits (ADR 600 and 601) for designating a write address among 16 bits of address data output from the second processor 3 are fed to write address terminals WA0 and WA1 of the second data buffer 39. The logical multiplication of the lower 2 bits (ADR 600 and 601) is performed by an AND circuit 61 and the resulting output is fed to a D terminal of a flip-flop (F/F) 62. Upper 14 bits (ADR 602 to 615) for designating an address for I/O port and a write strobe signal $\overline{SIOW6}$ output from the second processor 3 are both fed to a decoder 63. The decoder 63 decodes address data from the second processor 3 to provide a buffer write strobe signal $\overline{SRGW6}$ for the second data buffer 39 to a write enable terminal WE of the second data buffer 39, a clock terminal CK of the F/F 62 and a clear terminal CLR of a flip-flop (F/F) 64.

On the other hand, among 16 bits output from the first processor 1, lower 2 bits (ADR 800 and 801) for designating a read address are fed to read address terminals RA0 and RA1 of the second data buffer 39. The logical multiplication of the lower 2 bits (ADR 600 and 601) is performed by an AND circuit 65 and the resulting output is fed to a D terminal of the F/F 64. Upper 14 bits (ADR 802 to 815) for designating an address of I/O port and read strobe signal $\overline{SIOR8}$ output from the first processor 1 are both supplied to a decoder 66. The decoder 66 decodes address data from the first processor 1 to provide a buffer read strobe signal $\overline{SRGR8}$ for the second data buffer 39 to a read enable terminal RE of the second buffer 39, a clock terminal CK of the F/F 64 and a clear terminal CLR of the F/F 62.

Outputs labelled by IRSW6 and IRSR8 output from respective Q terminals of the F/F's 64 and 62 are used as status signals for checking interrupt causes. Outputs labelled by $\overline{IRQ8}$ and $\overline{IRQ6}$ from the open-collector gates 68 and 67 and interrupt request signals of the first and second processors 1 and 3 are used as interrupt request signals to the first and second processors 1 and 3, respectively.

The relationship between the internal configuration of the first and second data buffers 38 and 39 and the first and second systems 33 and 36 is shown in FIG. 2. Namely, similarly to the first embodiment, the first data buffer 38 has four divided-memory areas assigned to four addresses labelled by A(0) to A(3), each having a data capacity of four bytes. Likewise, the second data buffer 38 has four-divided memory areas assigned to four addresses labelled by B(0) to B(3), each having a data capacity of four bytes.

Figure 7:
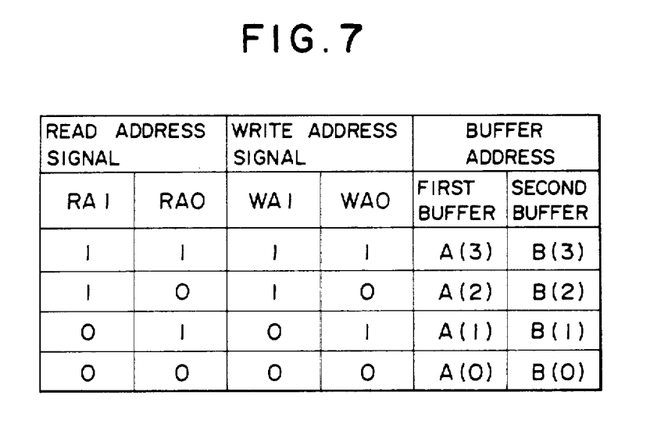
FIG. 7 shows a table showing the relationship between each data buffer and address signals shown in FIGS. 4 to 6.

FIG. 7 is an explanatory view showing the relationship between addresses A(0) to A(3) of the first data buffer 38 and those B(0) to B(3) of the second data buffer 39 and read/write address signals. As shown in FIG. 7, the addresses A(0) to A(3) and B(0) to B(3) are denoted by address signals RA0 and RA1 of 2 bits, and address signals WA0 and WA2 of 2 bits, respectively.

Figure 8:
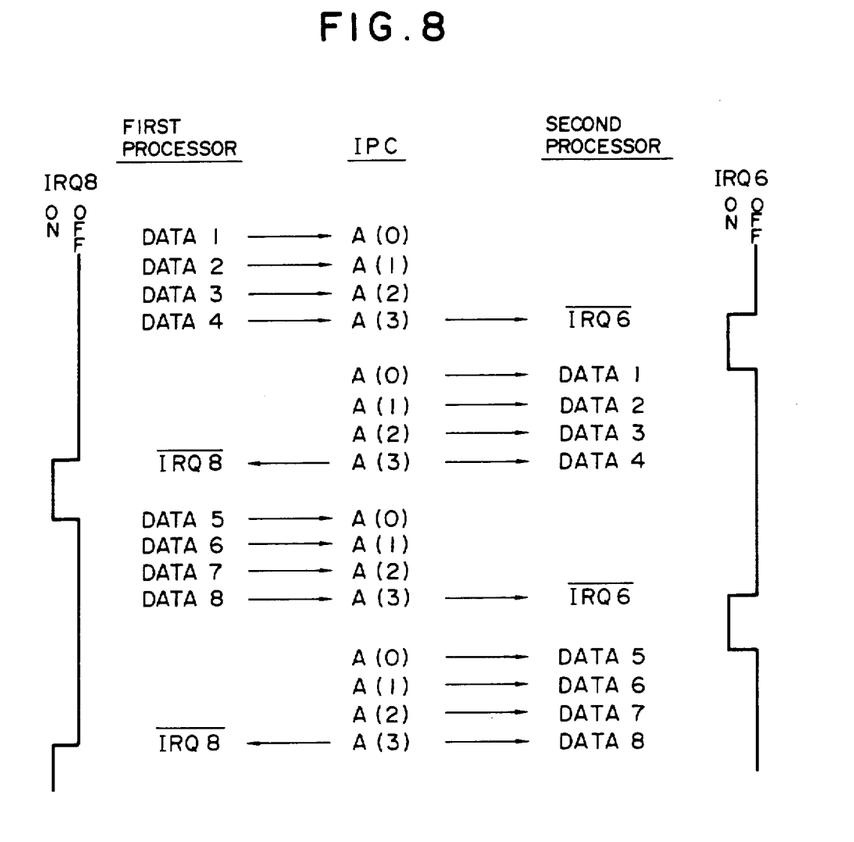
FIGS. 8 and 9 are explanatory views for an operation of the second embodiment shown in FIGS. 4 to 6.

FIG. 8 is an explanatory view for an operation of data transfer from the first processor 1 to the second processor 3. Where data (DATA 1 to 4) of four bytes is transferred from the first system 33 to the second system 36, the first processor 1 first provides address data (0, 0) of lower 2 bits (ADR 800 and 801) to the write address terminals WA0 and WA1 of the first data buffer 38, thereby to designate the zero address (A(0)). Further, the first processor 1 designates an address for the I/O port with address data of upper 14 bits (ADR 802 to 815) and produces a write strobe signal $\overline{SIOW8}$ to the decoder 53. In addition to this, the first processor 1 produces data DATA 1 on the data line 42. Thus, when a buffer write strobe signal $\overline{SRGW8}$ created by the decoder 53 and provided to the write enable terminal WE shifts to low level (which will be simply called "L" hereinafter), the DATA 1 is written into a memory area assigned to the address A(0) of the first data buffer 38. Subsequently, in a similar manner, when address data of the lower 2 bits, i.e., ADR 800 and ADR 801 are logical "1" and "0" (which will be simply called "1" and "0"), respectively, DATA 2 is written into a memory area assigned to the address A(1) from the first processor 1. When ADR 800 is "0" and ADR 801 is "1", DATA 3 is written into a memory area assigned to the address A(2). Similarly, when ADR 800 is "1" and ADR 801 is "1", DATA 4 is written into a memory area assigned to the address A(3).

Where DATA 4 is written into a memory area assigned to the address A(3), ADR 800 and ADR 801 are both equal to "1". As a result, an output from the AND circuit 51 is inverted from "0" to "1" and the inverted output is supplied to a D terminal of the F/F 52. Accordingly, the F/F 52 is set in synchronism with a rising of the buffer strobe signal $\overline{SRGW8}$, thus allowing a Q output, i.e., an interrupt request signal IRSR 6 to shift to high level (which will be simply called "H" hereinafter). The interrupt request signal IRSR 6 requires the second processor 3 to read DATA 1 to 4 out of the first data buffer 38.

Then, transfer data from the first data buffer 38 to the second processor 3 is read out of the first data buffer 38. The second processor 3 first provides address data (0, 0) of lower 2 bits (ADR 600 and 601) to read address terminals RA0 and RA1 of the first data buffer 38, thereby designating the address A(0). Further, the second processor 3 designates an address of the I/O port with address data of upper 14 bits (ADR 602 to 615) and produces a read strobe signal $\overline{SIOR6}$ to the decoder 56. Thus, when a buffer read strobe signal $\overline{SRGR6}$ created by the decoder 56 and fed to the read enable terminal RE of the first data buffer 38 shifts to "L", DATA 1 holded in the memory area assigned to the address A(0) is output on the data line 43. The second processor 3 reads DATA 1 on the data line 43 thereinto in synchronism with rising of this signal $\overline{SRGR6}$.

On the other hand, since the buffer read strobe signal $\overline{SRGR6}$ is also fed to the CLR terminal of the F/F 52, it is reset in synchronism with the read operation of DATA 1, so that its Q output shifts from "H" to "L". For this reason, the interrupt request which has been provided to the second processor 3 is released. Subsequently, in a similar manner, when the address data of lower 2 bits, i.e., ADR 600 and ADR 601 are equal to "1" and "0" respectively, DATA 2 is read from the memory area assigned to the address A(1) to the second processor 31. Further, when ADR 600 is equal to "0" and ADR 601 is equal to "1", DATA 3 is read from the memory area assigned to the address A(2). Furthermore, when ADR 600 and ADR 601 are equal to "1", DATA 4 is read from the memory area assigned to the address A(3).

When DATA 4 is read from the memory area assigned to the address A(3), ADR 600 and ADR 601 are both equal to "1", an output from the AND circuit 55 shifts from "0" to "1" and the inverted output is fed to the D terminal of the F/F 54. For this reason, the F/F 54 is set in synchronism with rising of the buffer strobe signal $\overline{SRGR6}$, thereby allowing an Q output, i.e., interrupt request signal IRSW8 to shift to "H". The interrupt request signal IRSW8 requires the first processor 1 to write transfer data (DATA 5 to DATA 8) into the first data buffer 38. When DATA 5 is written, the F/F 54 is set in response to the buffer write strobe signal $\overline{SRGW8}$.

Subsequently, DATA 5 to DATA 8 will be transferred in accordance with the same procedure as the transfer of DATA 1 to DATA 4.

Figure 9:
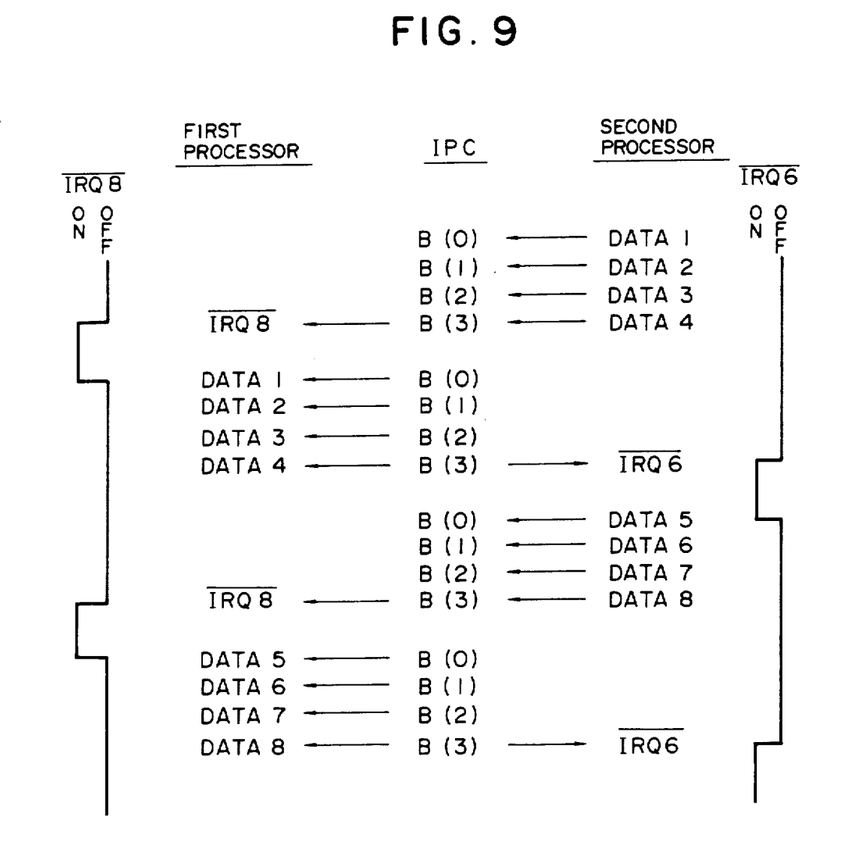

FIG. 9 is a view for explaining the operation of a data transfer from the second processor 3 to the first processor 1 in the embodiment shown in FIGS. 4 to 7. Where data (DATA 1 to DATA 4) of four bytes are transferred from the second system 36 to the first system 33, the second processor 3 first provides address data (0, 0) of lower 2 bits (ADR 600 and 601) to write address terminals WA0 and WA1 of the second data buffer 39, thereby designating the address B(0). Further, the second processor 3 designates an address of the I/O port with address data of upper 14 bits (ADR 602 to 615) and produces a write strobe signal $\overline{SIOW6}$ to the decoder 63. In addition to this, the second processor 3 produces DATA 1 on the data line 44. Thus, when the buffer strobe signal $\overline{SRGW6}$ created by the decoder 63 and fed to the write enable terminal WE of the second data buffer 39 shifts to "L", DATA 1 is written into the memory area assigned to the address B(0) of the data buffer 39. Subsequently, in a similar manner, when address data of lower 2 bits, i.e., ADR 600 and ADR 601 are equal to "1" and "0", respectively, DATA 2 is written into the memory area assigned to the address B(1). Further, when ADR 600 and ADR 601 are equal to "0" and "1", respectively, DATA 3 is written into the memory area assigned to the address B(2). Furthermore, when ADR 600 and ADR 601 are both equal to "1", DATA 4 is written into the memory area assigned to the address B(3).

Where DATA 4 is written into the memory area assigned to the address B(3), ADR 600 and ADR 601 are both equal to "1". Accordingly, an output from the AND circuit 61 is inverted from "0" to "1" and the inverted output of "1" is fed to the D terminal of the F/F 62. For this reason, the F/F 62 is set in synchronism with rising of the buffer strobe signal $\overline{SRGW6}$, thereby allowing a Q output, i.e., an interrupt request signal IRSR8 to be shifted to "H". The interrupt request signal IRSR8 requires the first processor 1 to read transfer data (DATA 1 to DATA 4) from the second data buffer 39.

Then, the reading operation of transfer data from the second data buffer 39 to the first processor 1 is effected. The first processor 1 first provides address data (0, 0) of the lower two bits (ADR 800 and 801) to the read address terminals RA0 and RA1 of the second data buffer 39, thereby designating the address (B(0)). Further, the first processor 1 designates an address of the I/O port with address data of upper 14 bits (ADR 802 to 815), and produces a read strobe signal $\overline{SIOR8}$ to the decoder 66. Thus, when a buffer read strobe signal $\overline{SRGR8}$ created by the decoder 66 and provided to the read enable terminal RE of the second data buffer 39 shifts to "L", DATA 1 which has been stored in the memory area assigned to the address B(0) is output on the data line 45. The first processor 1 reads DATA 1 on the data line 45 thereinto in synchronism with rising of this signal $\overline{SRGR8}$.

On the other hand, since the buffer read strobe signal $\overline{SRGR8}$ is also fed to the CLR terminal of the F/F 62, it is reset in synchronism with the reading operation of DATA 1, so that its Q output shifts from "H" to "L". For this reason, the interrupt request which has been provided to the first processor 1 is released. Subsequently, in a similar manner, when address data of lower 2 bits, i.e., ADR 800 and ADR 801 are equal to "1" and "0", respectively, DATA 2 is read from the memory area assigned to the address B(1) to the first processor 1. Further, when ADR 800 and ADR 801 are equal to "0" and "1", respectively, DATA 3 is read from the memory area assigned to the address B(2). Furthermore, when ADR 800 and ADR 801 are both equal to "1", DATA 4 is read from the memory area assigned to the address B(3).

Where DATA 4 is read from the memory area assigned to the address B(3), ADR 80p and ADR 801 are both equal to "1". Accordingly, an output from the AND circuit 65 is inverted from "0" to "1" and the inverted output of "1" is fed to the D terminal of the F/F 64. For this reason, the F/F 64 is set in synchronism with rising of the buffer read strobe signal $\overline{SRGR8}$, thus allowing a Q output, i.e., an interrupt request signal IRSW6 to be shifted to "H". The interrupt request signal IRSW6 requires the second processor 3 to write transfer data (DATA 5 to 8) into the second data buffer 39. When the DATA 5 is written thereinto, the F/F 64 is set in response to the buffer write strobe signal $\overline{SRGW6}$.

Subsequently, DATA 5 to 8 are transferred in accordance with the same procedure as that of transfer in respect of DATA 1 to 4.

Similar to the above-mentioned first embodiment, the first data buffer 38 may be N bytes (N is a positive integer), the second data buffer 39 may be M bytes (M is a positive integer), and the internal architecture of each processor may be four bits or 32 bits, etc.

What is claimed is:

1. In a multiprocessor system including at least a first processor and a second processor, in which bidirectional data transfer is effected between said first processor and said second processor, the improvement wherein said system comprises:
   a first data buffer means connected to said first processor and said second processor, for holding a first transfer data from said first processor to said second processor;
   a second data buffer means connected to said first processor and said second processor, for holding a second transfer data from said second processor to said first processor;
   a first interrupt control means connected to said first processor and said second processor, for providing a first interrupt request signal to said second processor on the basis of write address data fed to said first data buffer from said first processor and a second interrupt request signal to said first processor on the basis of read address data fed to said first data buffer from said second processor; and
   a second interrupt control means connected to said first processor and said second processor, for providing a third interrupt request signal to said first processor on the basis of write address data fed to said second data buffer from said second processor and a fourth interrupt request signal to said second processor on the basis of read address data fed to said second data buffer from said first processor;
   wherein said first processor is interrupted in response to said second interrupt request signal to write said first transfer data into said first data buffer means, and said second processor is interrupted in response to said first interrupt request signal to read out said first transfer data from said first data buffer means, whereby said first transfer data is transferred from said first processor to said second processor via said first data buffer; and
   wherein said second processor is interrupted in response to said fourth interrupt request signal to write said second transfer data into said second data buffer means, and said first processor is interrupted in response to said third interrupt request signal to read out said second transfer data from said second data buffer means, whereby said second transfer data is transferred from said second processor to said first processor via said second data buffer.

2. A system according to claim 1,
   wherein said first interrupt control means provides said first interrupt request signal when data write to said first data buffer is completed and said second interrupt request signal when data read from said first data buffer is completed; and
   wherein said second interrupt control means provides said third interrupt request signal when data write to said second data buffer is completed and said fourth interrupt request signal when data read from said second data buffer is completed.

3. A system according to claim 1, wherein said system further comprises:
   a first decoder for decoding said write address data fed to said first data buffer means to output a first decode signal;
   a second decoder for decoding said read address data fed to said second data buffer means to output a second decode signal;
   a third decoder for decoding said write address data fed to said second data buffer means to output a third decode signal; and
   a fourth decoder for decoding said read address data fed to said second data buffer means to output a fourth decode signal;
   wherein said first interrupt control means includes:
   a first flip-flop for providing said first interrupt request signal, said first flip-flop being set by said first decode signal and being reset by said second decode signal; and
   a second flip-flop for providing said second interrupt request signal, said second flip-flop being set by said second decode signal and being reset by said first decode signal; and
   wherein said second interrupt control means includes:
   a third flip-flop for providing said third interrupt request signal, said third flip-flop being set by said third decode signal and being reset by said fourth decode signal; and
   a fourth flip-flop for providing said fourth interrupt request signal, said fourth flip-flop being set by said fourth decode signal and being reset by said third decode signal.

4. A system according to claim 2, wherein said system further comprises:
   a first decoder for decoding said write address data fed to said first data buffer means to output a first decode signal;
   a second decoder for decoding said read address data fed to said second data buffer means to output a second decode signal;
   a third decoder for decoding said write address data fed to said second data buffer means to output a third decode signal; and
   a fourth decoder for decoding said read address data fed to said second data buffer means to output a fourth decode signal;
   wherein said first interrupt control means includes:

a first flip-flop for providing said first interrupt request signal, said first flip-flop being set by said first decode signal and being reset by said second decode signal; and a second flip-flop for providing said second interrupt request signal, said second flip-flop being set by said second decode signal and being reset by said first decode signal; and wherein said second interrupt control means includes:

a third flip-flop for providing said third interrupt request signal, said third flip-flop being set by said third decode signal and being reset by said fourth decode signal; and a fourth flip-flop for providing said fourth interrupt request signal, said fourth flip-flop being set by said fourth decode signal and being rest by said third decode signal.

5. A system according to claim 1, wherein said first processor differs from said second processor in internal architecture.

6. A system according to claim 2, wherein said first processor differs from said second processor in internal architecture.

7. A system according to claim 3, wherein said first processor differs from said second processor in internal architecture.

8. A system according to claim 4, wherein said first processor differs from said second processor in internal architecture.

* * * * *